Feb. 13, 1940.  D. G. MORGAN  2,190,368
WHEELED TRUCK
Filed Dec. 19, 1938  2 Sheets-Sheet 1
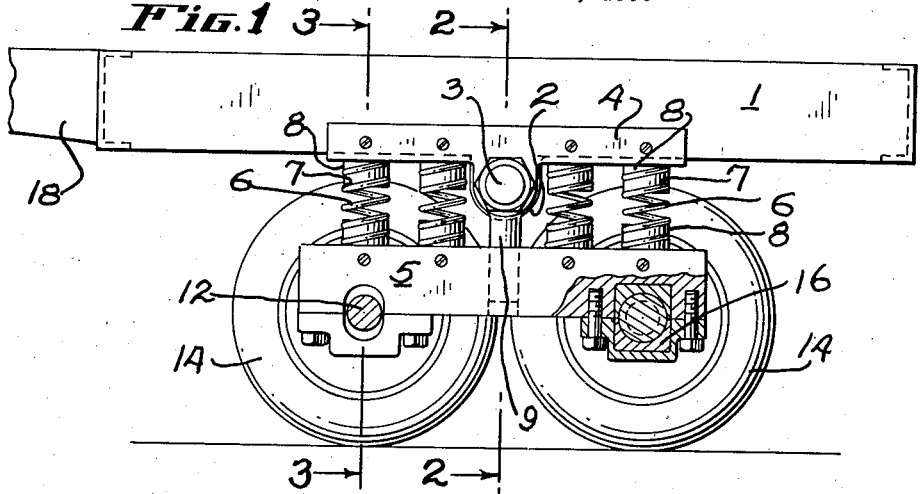
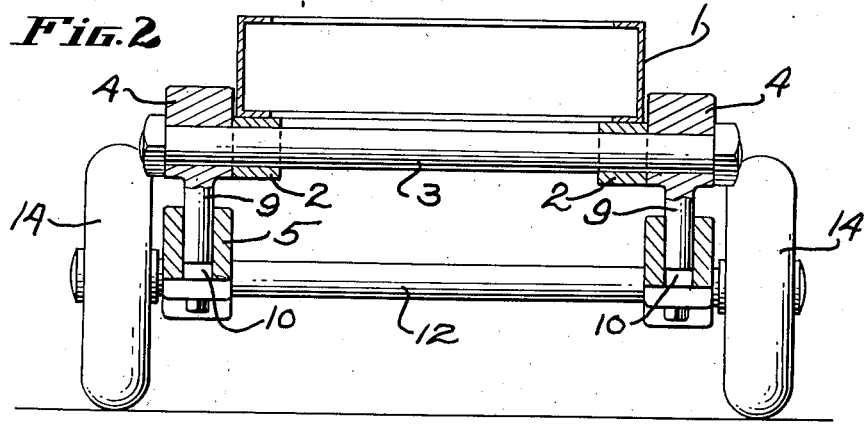
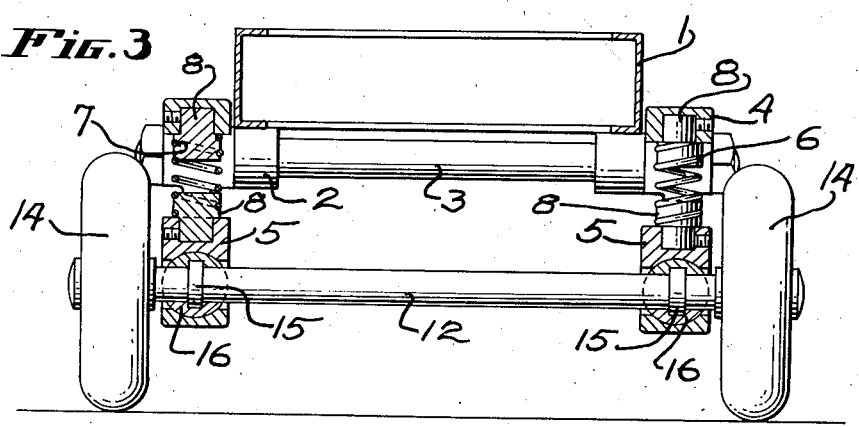
INVENTOR.
DAVID G. MORGAN.
BY
Lippincott & Metcalf
ATTORNEYS.

Feb. 13, 1940.  D. G. MORGAN  2,190,368
WHEELED TRUCK
Filed Dec. 19, 1938  2 Sheets-Sheet 2

INVENTOR.
DAVID G. MORGAN
BY Lippincott Metcalf
ATTORNEYS.

Patented Feb. 13, 1940

2,190,368

UNITED STATES PATENT OFFICE 2,190,368

WHEELED TRUCK

David G. Morgan, San Francisco, Calif.

Application December 19, 1938, Serial No. 246,559

7 Claims. (Cl. 280—124)

My invention relates to wheeled trucks, and more particularly to a four-wheeled truck suitable for use over rough terrain.

Among the objects of my invention are: To provide a four-wheeled, closely coupled truck for use over rough terrain; to provide a four-wheeled truck mounting having individual axle action; to provide a four-wheeled truck tending to stabilize the plane of the load; and to provide a simple and efficient four-wheeled truck permitting weaving of the wheels without substantial displacement of the load.

Other objects of my invention will be apparent or will be specifically pointed out in the description forming a part of this specification, but I do not limit myself to the embodiment of the invention herein described, as various forms may be adopted within the scope of the claims.

The word "truck" is used in this application in the sense that it defines a set of wheels carrying a frame suitable for transporting a load, and is not used in the sense defining a complete automotive vehicle.

My invention is particularly adapted for the use of carrying heavy loads, such as logs, and is adapted to be towed, if desired, by a tractor or other automotive device.

Referring to the drawings:

Fig. 1 is a side view in elevation, partly in section, of one preferred embodiment of my device as utilized in a trailer.

Fig. 2 is a cross-sectional view, partly in elevation, taken as indicated by the line 2—2 in Fig. 1.

Fig. 3 is a cross-sectional view, partly in elevation, taken as indicated by the line 3—3 in Fig. 1.

Figure 4:
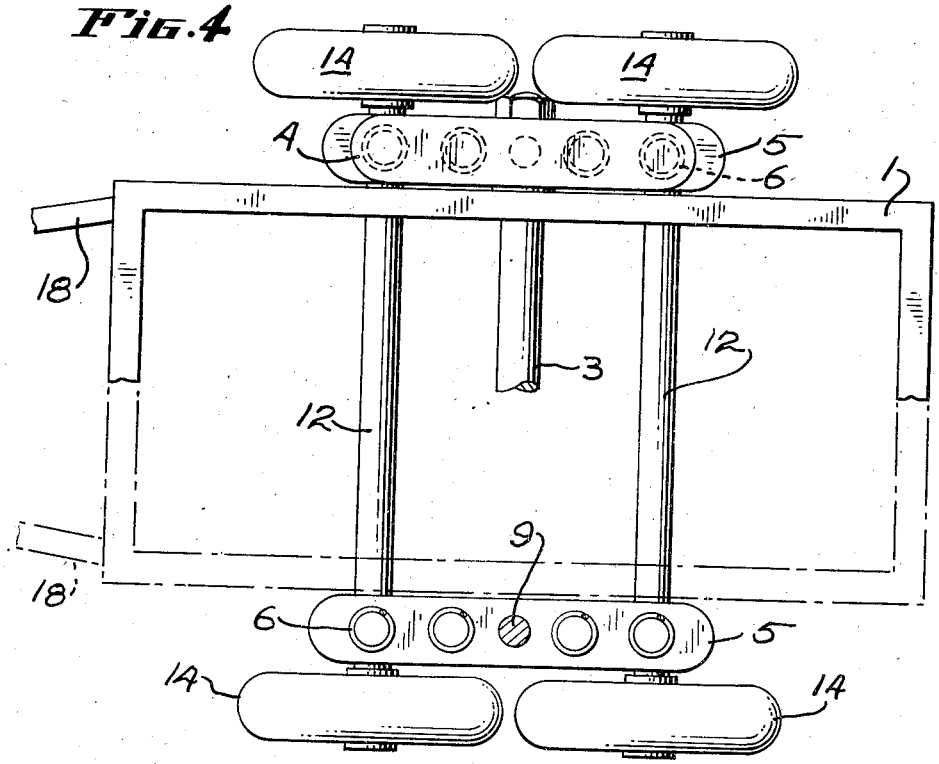
Fig. 4 is a top view in elevation, part of the loading frame being shown as cut away.

Referring directly to the drawings for a more detailed description of my invention, a load carrying frame 1 carries a pair of bearings 2. Through these bearings runs a frame axle 3, attached at each side to spring beds 4. Immediately below spring beds 4 are positioned parallel wheel beams 5. Spring beds 4 are supported on wheel beams 5 by a plurality of, preferably four, coil springs 6, these springs being engaged in threads 7 of spring studs 8 at each terminal of each spring, the spring bed studs being fastened to the spring bed and the wheel beam studs being fastened to the wheel beams 5.

In order to prevent relative horizontal motion between the spring bed members 4 and the wheel beam members 5, a torque column 9 is projected from each spring bed to enter a torque recess 10 in each wheel beam. Thus, the wheel beams may move vertically with relation to the spring beds in accordance with spring action, but cannot move horizontally with relation thereto, thus taking care of the torque exerted by inertia, braking, traction, etc., the torque column 9 sliding freely within torque recess 10.

Wheel beams 5 are supported normally parallel, wheel axles 12 passing through each wheel beam in a special bearing which will be described later, and outside of the wheel beams, each axle 12 is provided with a pair of wheels 14. The wheel axles are preferably spaced sufficiently close together so that the wheels on each side will have ample clearance yet be sufficiently close to distribute the load properly.

Inasmuch as one of the difficulties that has arisen in the use of closely coupled four-wheeled trucks of the type described has been that it has heretofore been necessary to spring each wheel individually I have been able to utilize common springs for the four wheels by providing axle bearings which will allow the wheel axles to depart from parallelism in the horizontal plane, but which will maintain the axle movement in parallel vertical planes. While I have shown my axles in this embodiment as being solid axles and rotating, it will be obvious that dead axles may be utilized by following the teachings to be given herein.

Figure 5:
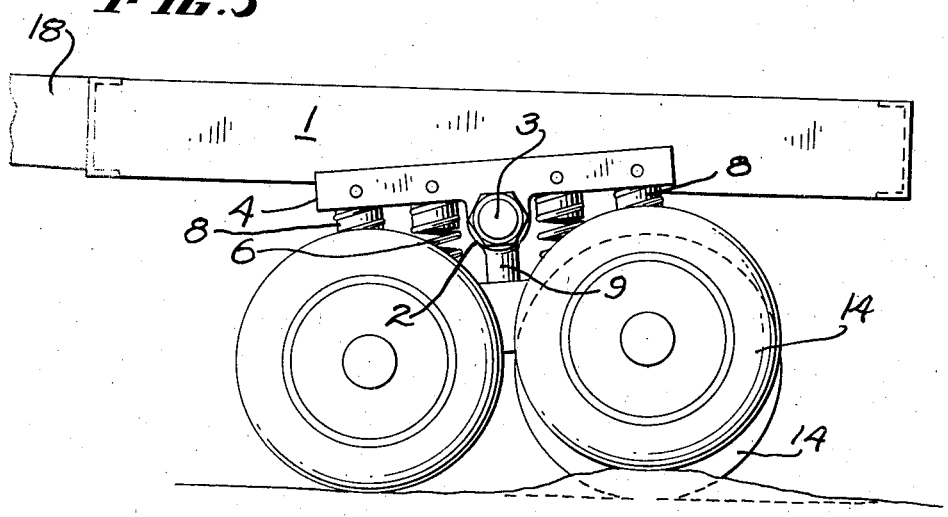
Fig. 5 is a side view in elevation showing the weaving action of the axles in a truck of my invention.

Referring, for example, to Fig. 3, each axle is provided, within the boundaries of wheel beams 5, with thrust collars 15. These thrust collars fit thrust slots in split cylindrical bearings 16, the axes of these cylindrical bearings being parallel to the extent of the wheel beams and to the direction of motion of the truck. The outer surfaces of these cylindrical bearings fit cylindrical cavities in wheel beams 5, thus allowing each axle to assume an angular relationship to the horizontal plane independently of the other axle, so that when the truck rides over an obstruction, as shown in Fig. 5, the high wheel will cause rotation of the cylindrical bearing of the axle to which the wheel is attached within wheel beam 5. This action will, as shown in Fig. 5, provide an angular relationship of spring bed 4 to the load frame 1, but does not greatly tilt load frame 1.

Thus, in driving the truck of my invention over rough terrain, each axle is free to assume individual angles rocking the spring bed wihout greatly disturbing the plane of load frame 1.

When only one wheel of the four is high, or when one pair of diagonal wheels is high, both axles will be free to depart from the horizontal plane without greatly disturbing the load frame plane. Load frame 1, of course, will be tipped when both wheels on one side are high, but even under such extreme conditions the tipping is greatly reduced from what it would otherwise be.

Angular displacement of axles 12 will of course very slightly decrease the distance between axle bearing centers, although the distance between torque columns 9 will always be the same. No binding of torque columns 9, however, will take place in recesses 10, inasmuch as sufficiently large clearances will be present in bearings 15—16, 16—5, 9—10 and to some extent 2—3, to take up the slight change in horizontal distance and thus prevent binding during road travel.

I have shown the preferred form of the truck of my invention as provided with towing tongues 18, but it will be obvious that if desired, tongues 18 may be disposed of, and the load itself used for towing, as is commonly done when transporting long logs, piles, poles, and the like materials.

While I have shown my invention as applied to a specific form, this form is exemplary only and equivalent structures will be obvious to those skilled in the art, within the scope of the appended claims.

I claim:

1. A truck comprising a pair of normally parallel wheel beams, a pair of normally parallel axles each passing through said wheel beams and terminating in wheels, cylindrical bearings connecting said axles and said wheel beams, said bearings having their axes fixedly parallel to the extent of said wheel beams, a pair of spring beds positioned above said wheel beams, and connected by a bed axle, a plurality of springs connecting the spring beds with said wheel beams on each side, a torque carrying connection between said spring connected spring beds and wheel beams, and a load frame mounted on said bed axle.

2. Apparatus in accordance with claim 1, wherein coil springs are attached to connect said wheel beams and spring beds.

3. Apparatus in accordance with claim 1, wherein coil springs are attached to connect said wheel beams and spring beds, said springs being equally distributed on each side of said bed axle.

4. Apparatus in accordance with claim 1, wherein coil springs are attached to connect said wheel beams and spring beds, and wherein the ends of said springs fit threads in mounting bosses on said beams and beds.

5. Apparatus in accordance with claim 1, wherein said torque carrying connection is a member attached to said spring bed and engaging the wheel beam below with a bearing permitting vertical relative motion only.

6. Apparatus in accordance with claim 1, wherein each of said wheel axles is a live axle and rotates within said cylindrical bearing.

7. Apparatus in accordance with claim 1, wherein each of said wheel axles is a live axle and rotates within said cylindrical bearing, and wherein a thrust collar on said live axles engages interior surfaces of said cylindrical bearings.

DAVID G. MORGAN.